July 10, 1962 A. H. WILKINSON 3,043,549
APPARATUS FOR STABILIZING EQUIPMENT
Filed July 17, 1959 2 Sheets-Sheet 1
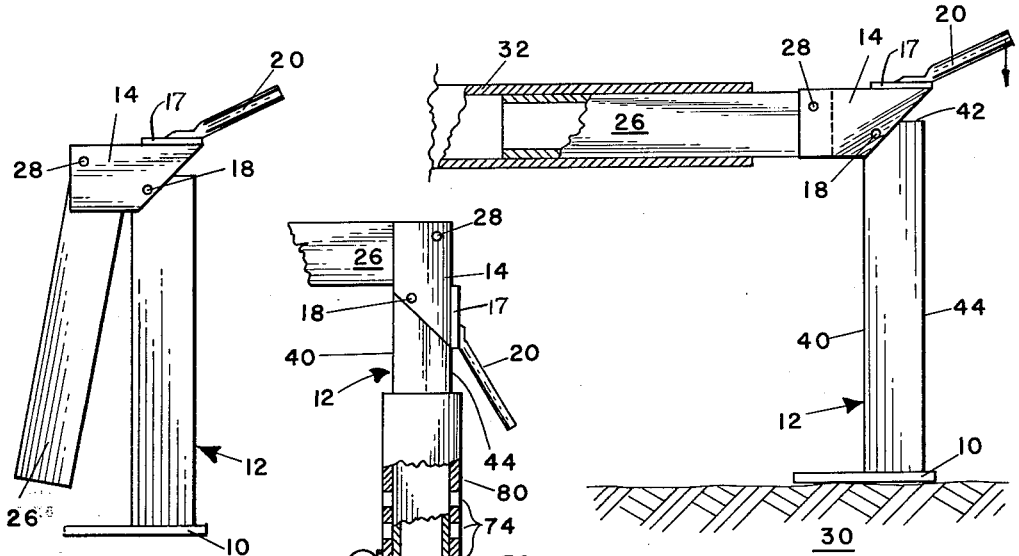
FIG. 1  FIG. 2
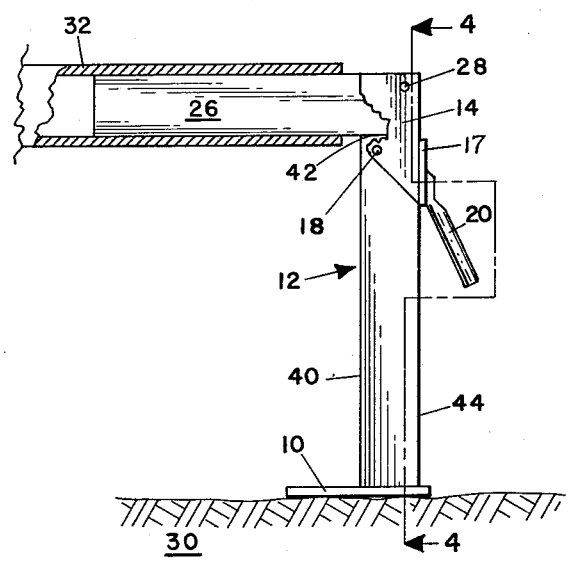
FIG. 6
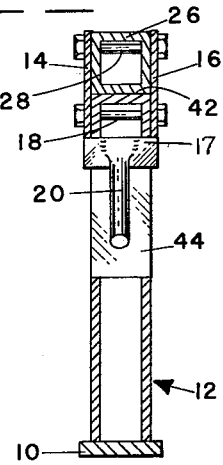
FIG. 4
FIG. 3
A. H. WILKINSON
INVENTOR.
BY *James R. Head*
ATTORNEY

United States Patent Office 3,043,549
Patented July 10, 1962

3,043,549
APPARATUS FOR STABILIZING EQUIPMENT
Alvin H. Wilkinson, Talala, Okla., assignor to
Auto-Crane Company, Tulsa, Okla.
Filed July 17, 1959, Ser. No. 827,929
5 Claims. (Cl. 248—351)

This invention relates to apparatus for stabilizing equipment. More particularly, the invention relates to a jack-type removable support leg for static vehicular equipment.

Briefly, this invention concerns a mechanically actuated support leg that is easily installed and attached to complementary mounting brackets or vehicular equipment. The apparatus provides a supporting connection from equipment to ground to stabilize oscillatory motion created by external forces on and to the equipment. Typically, these forces are caused by use of hoist and crane type of equipment on vehicles. The hoist device is manually, hydraulically, or mechanically operative from the vehicle to lift and move objects from a position outside the framework of the vehicle to a position on the vehicle or from one location to another. The hoisting apparatus is rigidly attached to the body portion of the vehicle. The body, however, is attached to the chassis frame through a spring and shock absorbing system. It is well known that in using such hoist apparatus to lift a heavy object, the vehicle will yield under the force, due to the flexible system.

Accordingly, it is an object of this invention to overcome the objections in using vehicular mounted equipment.

It is another object of this invention to provide an apparatus for stabilizing equipment, especially vehicular hoisting mechanisms.

It is a further object of this invention to provide an apparatus for relieving undue strain to vehicles and their components while using attached hoisting equipment.

It is still a further object of this invention to provide a stabilizer-type anchoring system against which the thrust load of hoisting equipment may be exerted.

It is still a further object of this invention to provide a jack and support leg for stabilizing vehicular type hoisting equipment which is easily installed and removed.

It is still a further object of this invention to provide a removable stabilizer jack which folds into a compact size and may be easily handled.

Another object of this invention is to provide a stabilizing apparatus which is adjustable in height from an associated bracket attached to the apparatus and the ground level.

These and other objects will become more apparent from further reading of the specification and claims when taken in conjunction with the following illustrations of which:

FIGURE 1 represents the support jack of this invention in the inactive position.

FIGURE 2 represents an elevational and part sectional view illustrating the support jack of this invention in the first stage of the placement.

FIGURE 3 is an elevational and part sectional view of the support leg of this invention in the final supporting position.

FIGURE 4 is a sectional view taken along the line 4—4 of FIGURE 3.

FIGURE 6 is an elevational and part sectional view of a vertical base portion describing an alternate embodiment of this invention.

Description

Figure 5:
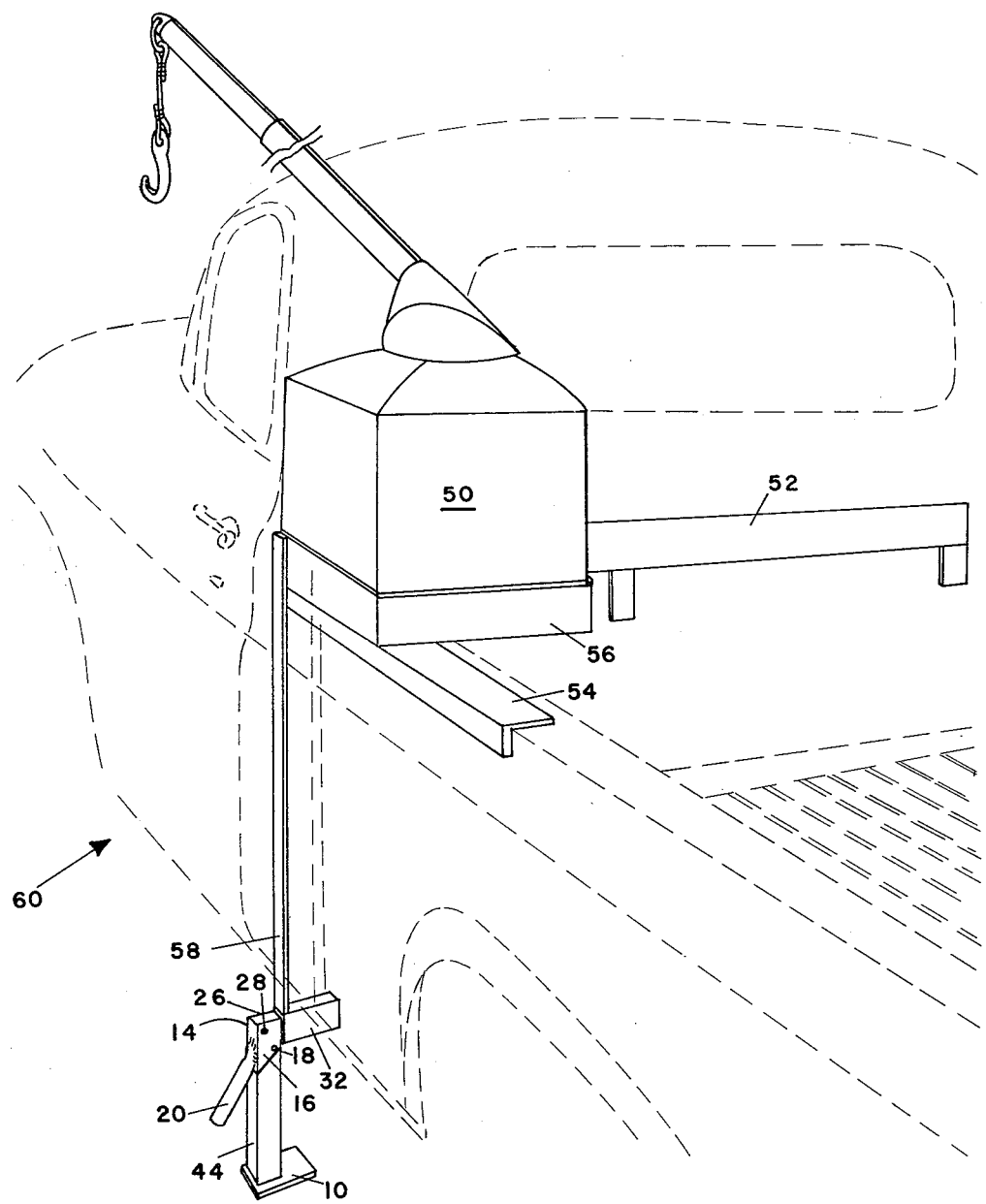
FIGURE 5 is an elevational view of a typical mounting installation of the support leg on a vehicular truck body.

Referring specifically now to FIGURE 1, the apparatus of this invention is shown in its inoperative position and includes a flat base portion 10, to which a vertical support member 12 is rigidly affixed. Vertical member 12 is typically of tubular construction, such as square tubing. Parallel lever-forming plates 14 and 16, of which only the former is shown in the elevational view, are adapted to straddle the upper portion of vertical member 12 and pivot about connecting pin 18. Handle 20 is rigidly affixed to parallel plates 14 and 16 by a stop plate 17 to maintain them in their parallel relationship and further provide an operating handle for actuating the apparatus. The combined handle 20, stop plate 17, and lever-forming plates 14 and 16 form a rigid lever arm assembly pivotal about connecting pin 18. Extension arm 26 is pivotally attached to the parallel plates 14 and 16 at pin 28. In some instances a relatively loose fit is provided between arm 26 and pin 28. This provides freedom of movement of the extension arm for the purpose of setting the support leg with respect to the receiving and mounting bracket 32 shown in FIGURE 2. In FIGURE 2 the support and stabilizing jack of this invention is shown in the first stage of operation. Bracket 32 is rigidly affixed to the body portion of a vehicle at a fixed distance above the ground level. In many instances bracket 32 is formed as a part of the hoisting equipment to provide direct stability to the thrust forces encountered. The jack of this invention is set when it is capable of providing a rigid support between ground 30 and mounting and receiving bracket 32. In FIGURE 2, the extension arm 26 is shown inserted in the mounting bracket 32. For the purposes of explanation and definition for the specification and claims herein, vertical support member 12 includes a forward portion 40, which is adapted to face towards the mounting bracket, a top portion 42, and a rearward portion 44, the operation and function of which will be hereinafter explained.

In FIGURE 3 the apparatus of this invention is shown in its final stabilizing and supporting position with respect to mounting bracket 32 and ground level 30. A cutaway of lever-forming plate 14 illustrates the position of extension arm 26 resting upon top portion 42 which is accomplished by rotation of handle 20 from its position in FIGURE 2 to its position in FIGURE 3. Upon reaching the position of FIGURE 3, the handle 20 and stop plate 17 engage with the rearward portion 44 of vertical support member 12 and thus prohibit the lever assembly from further clockwise rotation. Accordingly, increased weight or force applied to the vehicle body and mounting bracket 12, normally tending to move them downward against their springs, is restrained by the stabilizing apparatus of this invention. Such weight or force is transmitted through extension arm 26 directly upon vertical support 12 to the ground without unnecessary strain and shear on pins 18 and 28 since the relationship between arm 26 and bracket 32 prevents development of a force capable of rotating the lever assembly to a position wherein pins 18 and 28 would be under undue stress.

Of importance to this invention is the pivotal placement of pins 18 and 28 to effect the desired movement of extension arm 26 with respect to vertical support 12. Connecting pin 18 is located in that corner of vertical support 12 defined by the forward and top portions. Upon rotation of the lever assembly, including pin 28, about connecting pin 18 from a forward position off of top-dead-center, as seen in FIGURE 2, to a rearward position off of top-dead-center, as seen in FIGURE 3, extension arm 26 is raised slightly off of top portion 42 of vertical member 12 until engagement is again made with the top portion of vertical member 12. ("Top-dead-center" is defined as that point where pin 28 is in the same vertical plane with connecting pin 18, usually above the top portion of vertical support 12.) Extension arm 26, in its stabilizing position, engages with top portion 42 of the vertical support member at an angle approximately 90°, as seen in FIGURE 3. The off-center position of arm 26, and the fact that it is restrained within bracket 32 maintains the arm and thus the jack in a stabilizing position regardless of the load conditions on the vehicle.

The partial sectional rearward view of FIGURE 4 discloses the component parts of the stabilizer apparatus in its final fixed or stabilizing position.

FIGURE 5 represents a typical assembly using the stabilizing support leg of this invention with a vehicular truck. Hoist mechanism 50 is adapted to be received within a mounting frame, designated generally as 60, which includes a back member 52, side member 54, interconnected with hoist receiving frame 56. Vertical frame member 58 extends from the above side member 54 to a support leg mounting bracket 32 at its lower end. The support and stabilizer jack of this invention is shown in FIGURE 5 in its final supporting position with arm 26 received in mounting bracket 32.

Hoist 50 includes a boom cable and pickup hook which is movable to various positions about the vehicle. It is to be understood that the position of the hoist is not of critical limitation as it may be positioned at any part of the vehicular body.

FIGURE 6 discloses an additional embodiment. Vertical support member 12 is slidingly received by vertical support 80 on base 10. A multiplicity of vertically spaced openings 74 are arranged in opposite relation on support 80. These openings are adapted to line up with openings 70 in vertical support 12, while positioning pin 72 retains the support in given vertical relationship by extending through the openings.

*Operation*

The requisite operation of this invention may be best described by referring to all of the illustrations. The length of vertical support member 12 will depend upon the distance from normal ground level to mounting bracket 32 of the vehicle. As can be readily appreciated, the device can be easily carried by grasping handle 20. To position the jack for use, extension arm 26 is pivoted about pin 28 to a substantially horizontal position and inserted within bracket 32 as depicted in FIGURE 2.

When setting the jack in position for use, it is preferred that the overall length of vertical support member 12 and its base 10 be such that, when the vehicle to which mounting bracket 32 is attached is upon relatively level ground, top portion 42 is slightly above the bottom of the mounting bracket as shown in FIGURE 2.

When the jack has been positioned as just described, the lever arm assembly, comprising lever-forming plates 14 and 16 and affixed handle 20, it is rotated clockwise about connecting pin 18 (which acts as a fulcrum point) from a forward position to a rearward position. When the base 10 rests upon the ground 30, as shown in FIGURES 2 and 3, the rotational or pivotal movement of the lever arm assembly raises extension arm 26, bracket 32, and the vehicle body slightly as pin 28 approaches top-dead-center above pin 18. Further rotation causes the pin 28 to assume a rearward off-dead-center relation permitting that portion of extension arm 26 between the lever-forming plates 14 and 16 to transmit a part of the vehicle spring force and any load to member 12 by way of the top portion 42 thereof. Hence, the jack assumes the rigid stabilizing position of FIGURES 3 and 4.

In those instances where the distance between ground 30 and bracket 32 is greater than the overall vertical support and base length, the vertical support and base will hang clear of the ground. This is so because of the downwardly acting weights of vertical support 12 and handle 20. In this condition the jack is capable of function as any load upon the vehicle body and bracket 32 will cause the vertical support and base to contact the ground and hence provide the required stabilization.

To remove the stabilizer jack from the bracket 32, the lever assembly is rotated counter-clockwise. This slightly raises bracket 32 and the vehicle body upon its springs as pin 28 passes top-dead-center and continued pivotal movement of the lever assembly permits release of the arm 26 from bracket 32.

Although the invention has been disclosed in FIGURE 5 with the use of a single unit mounted under hoist apparatus 50, it is within the purview of this invention that more than one stabilizer support jack can be used. In some instances up to as many as four or more support jacks may be used for stabilizing the entire vehicle.

In order to vertically adjust the distance between ground level and mounting bracket 32, in those instances where required, the embodiment of FIGURE 6 is utilized. Pin 72 is removed while support 12 is raised or lowered to the predetermined height, then pin 72 is reinserted through the appropriate aligned openings.

The invention has been described with reference to specific and preferred embodiments. It will be apparent, however, that many modifications can be made without departing from the spirit of the invention. Accordingly, this invention should be construed not to be limited to the embodiment herein described, but should be limited only by the scope of the appended claims.

I claim:

1. Apparatus for stabilizing, with respect to ground, spring biased equipment of the type described comprising:

a vertical support member having a forward side, a rear side, a top and bottom restable on said ground;

lever-forming arm means, including an operating handle, pivotally attached, in a substantially vertical plane, about a substantially horizontally oriented connecting pin fastened to a top, forward portion of said support member;

a second pin on said arm means, spaced from and oriented substantially parallel with said connecting pin, and pivotal with said arm means along a raising and then descending arc between a location forward of a top-dead-center position, wherein said second pin is directly above said connecting pin, and a location rearward of said top-dead-center position;

and a longitudinal extension arm pivotal about said second pin in a substantially vertical plane and engageable with said top of said support member to form an angle of approximately 90° therewith upon pivotal movement of said arm means and said second pin to said location rearward of top-dead-center.

2. Apparatus according to claim 1 wherein said vertical support member includes upper and lower telescopically movable members capable of being fixably adjustable to vary the length of said vertical support.

3. Apparatus according to claim 1 including a relatively large surface area base horizontally attached to said bottom of said vertical support.

4. Apparatus according to claim 1 wherein said lever-forming arm means and operating handle includes a stop plate engageable, in said one position, with the rear side of said vertical support.

5. Apparatus for stabilizing spring biased equipment of the type described comprising;

a square-conduit vertical support member defining a forward side, a rear side, a top and bottom base;

lever-forming arms straddling and substantially parallel to both sides between said forward and rear sides, said arms including a rearwardly connected stop plate and handle extending outward therefrom, all of which form a lever arm assembly pivotally attached, in a substantially vertical plane, about a substantially horizontally oriented connecting pin fastened between said both sides at a top forward portion of said support member;

a second pin fastened between said lever-forming arms, spaced from and oriented substantially parallel with said connecting pin, and pivotal with said assembly along a raising then descending arc between a location forward of a top-dead-center position, wherein said second pin is directly above said connecting pin, and a location rearward of said top-dead-center position;

and a longitudinal square-conduit extension arm pivotal about said second pin between said lever-forming arms and engageable with said top of said support member to form an angle of approximately 90° therewith upon pivotal movement of said assembly and said second pin to said location rearward of said top-dead-center and wherein said stop plate substantially engages said rear side.

References Cited in the file of this patent

UNITED STATES PATENTS

| | | |
|---|---|---|
| 143,978 | Graham | Oct. 28, 1873 |
| 521,957 | Hayes | June 26, 1894 |
| 1,065,412 | Weiss | June 24, 1913 |
| 2,356,941 | Meyer | Aug. 20, 1944 |
| 2,791,348 | Adams | May 7, 1957 |
| 2,851,250 | Hansen | Sept. 9, 1958 |

FOREIGN PATENTS

| | | |
|---|---|---|
| 67,996 | France | Oct. 14, 1957 |
| 723,692 | Great Britain | Feb. 9, 1955 |
| 737,698 | Great Britain | Sept. 28, 1955 |
| 398,843 | Great Britain | Sept. 14, 1933 |